(12) United States Patent
Smith, Jr.

(10) Patent No.: US 6,408,882 B1
(45) Date of Patent: Jun. 25, 2002

(54) DIVERTER VALVE

(76) Inventor: Walter L. Smith, Jr., 2111 Foxfire La., DeLand, FL (US) 32720

( * ) Notice: Subject to any disclaimer, the term of this patent is extended or adjusted under 35 U.S.C. 154(b) by 0 days.

(21) Appl. No.: 09/709,129

(22) Filed: Nov. 8, 2000

Related U.S. Application Data
(60) Provisional application No. 60/164,126, filed on Nov. 8, 1999.

(51) Int. Cl.$^7$ .............................................. F16K 11/10
(52) U.S. Cl. ............................ 137/625.34; 137/625.13; 137/886
(58) Field of Search .................. 137/625.13, 625.17, 137/625.48, 625.33, 625.34, 872, 876, 886

(56) References Cited

U.S. PATENT DOCUMENTS

| | | |
|---|---|---|
| 2,485,504 A | 10/1949 | Morgan |
| 2,524,142 A | 10/1950 | Seeloff |
| 2,782,801 A | 2/1957 | Ludwig |
| 3,990,477 A | 11/1976 | Johnson |
| 4,066,239 A | 1/1978 | Hall |
| 4,182,275 A | 1/1980 | Fukano et al. |
| 4,190,082 A * | 2/1980 | Crespo .................. 137/625.17 |
| 4,345,228 A * | 8/1982 | Idogaki et al. .............. 335/222 |
| 4,739,797 A | 4/1988 | Scheffel |
| 4,899,842 A | 2/1990 | Emori et al. |
| 5,038,827 A * | 8/1991 | Heffner et al. .............. 137/627 |
| 5,058,626 A | 10/1991 | Takaoka et al. |
| 5,297,777 A | 3/1994 | Yie |
| 5,551,482 A | 9/1996 | Dixon et al. |
| 5,606,901 A | 3/1997 | Oki |

FOREIGN PATENT DOCUMENTS

| | | | | |
|---|---|---|---|---|
| FR | 569834 | * | 4/1924 | ................. 137/872 |
| GB | 2125942 | * | 3/1984 | ................. 137/872 |

* cited by examiner

Primary Examiner—John Fox
(74) Attorney, Agent, or Firm—Knobbe Martens Olson & Bear LLP

(57) ABSTRACT

An apparatus and method is disclosed for an improved diverter valve comprising a valve housing defining an internal chamber. A main port and a first and a second port communicate with the internal chamber in a Y-shape configuration. A spool valve element is slidably disposed within the internal chamber of the valve housing. An actuator moves the spool valve element between a first position and a second position for diverting fluid between the main port and the first port and the main port and the second port. The improved diverter valve is suitable for use with viscous fluids operating under high or low temperature and high pressure.

16 Claims, 10 Drawing Sheets

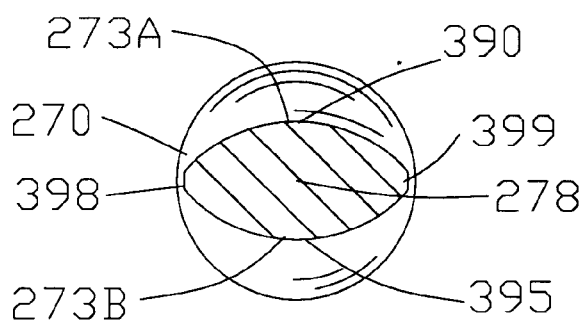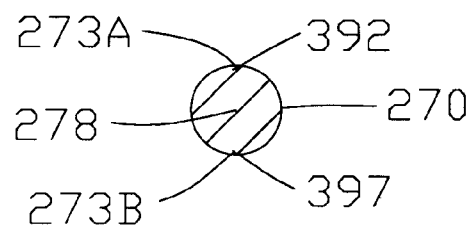
FIG. 21  FIG. 22
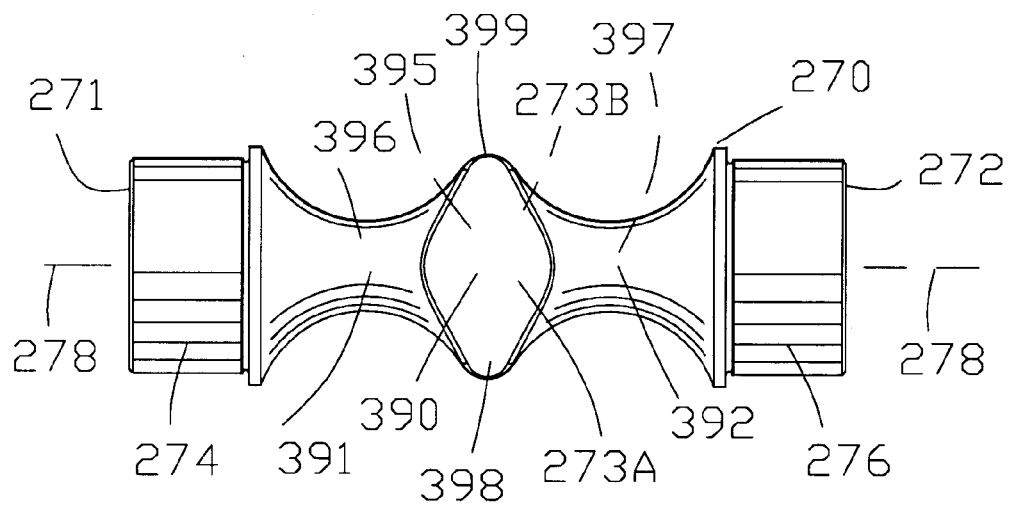
FIG. 23
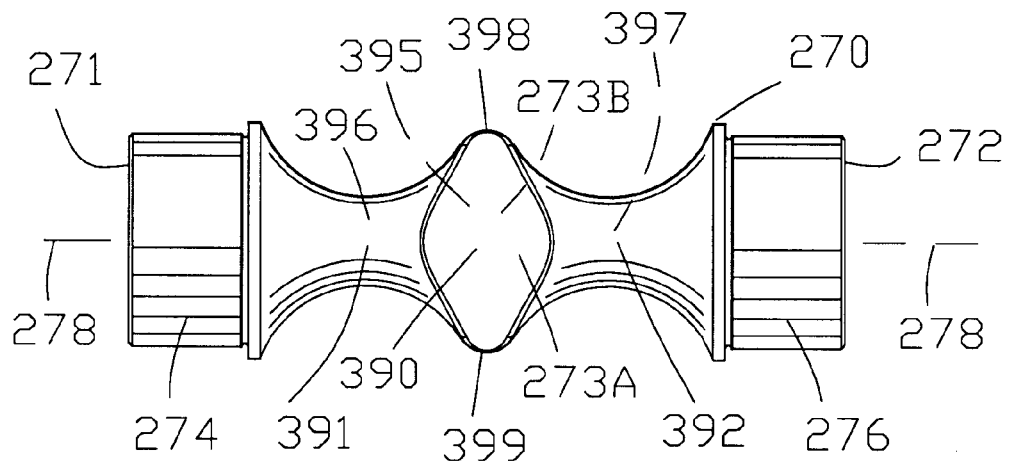
FIG. 24

DIVERTER VALVE

CROSS-REFERENCE TO RELATED APPLICATIONS

This application claims benefit of U.S. Patent Provisional application Ser. No. 60/164,126 filed Nov. 8, 1999. All subject matter set forth in provisional application Ser. No. 60/164,126 is hereby incorporated by reference into the present application as if fully set forth herein.

BACKGROUND OF THE INVENTION

1. Field of the Invention

This invention relates to valves, and more particularly to an improved diverter valve for providing fluid communication between a main port and a first and a second secondary port.

2. Background of the Invention

Diverter valves have the common characteristic of diverting fluid flow from a main port to either a first secondary port or a second secondary port. The main port can either be an input port or an output port with the first and second ports being either an output port or an input port, respectively. The primary function of the diverter valve is to allow fluid communication between the main port and only one of the first and second ports. In general, diverter valves prevent communication between the first and second ports.

Many diverter valves are commonly referred to as Y valves since these diverter valves take a basic Y-shape. The main port is the linear portion of the Y-shape and first and second ports are the divergent or the V-shape portion of the Y-shape. The Y valve has become very popular since the Y valve enables the diversion of fluid between a main port and either the first and second ports while maintaining excellent flow characteristics. The excellent flow characteristics of the Y valve are due to the fact the fluid is not substantially redirected into another direction such as a change in direction of ninety degrees or greater. The Y valve merely redirect the fluid flow through an acute angle such as a change in direction of much less than ninety degrees.

In general, diverter valves were formed from a valve housing having an internal valve chamber. The main port and the first and second ports communicated with the internal valve chamber. A valve element was movable within the internal valve chamber. The valve element was movable between a first and a second position for respectively communicating the main port to either the first port or the second port. The valve element could be slidably movable within the internal valve chamber or may be rotatably moveable within the internal valve chamber depending upon the design of the diverter valve.

U.S. Pat. No. 2,485,504 to Morgan discloses a valve comprising a body provided with a cylindrical bore having a circumferential groove therein and two ports communicating with the bore at opposite sides of the groove. A valve piston is mounted in the bore to control the flow of fluid between the ports and having a cylindrical portion which fits the bore closely. The piston and body are relatively slidable in the direction of the axis of the bore. A ring of yieldable material is mounted in the groove having an unstressed inside diameter somewhat less than the diameter of the bore so that the cylindrical portion of the piston may stress the ring to prevent leakage of fluid past the same. The piston also has a portion of reduced diameter connected to the cylindrical portion by a gradually tapered surface. The diameter of the reduced portion is substantially equal to the inside diameter of the unstressed ring. The reduced portion has one or more longitudinally extending grooves therein to permit fluid flow between the ports when the piston and body are so positioned relatively as to bring the reduced portion within the ring.

U.S. Pat. No. 2,524,142 to Seeloff discloses a fluid valve comprising a body member having a bore therein with a core member being slidably received in the bore. The improvement consists of an annular recess in one of the members and an annular valving land on the one of the members adjacent the recess and separated therefrom by an annular rounded shoulder. A circumferential groove in the other of the members is located to overlie the recess when the core member is in one axial position and to overlie the annular land when the core member is in its other axial position during normal operation of the valve. The other member is loosely interfitted with respect to the one of the members in the region of the annular land, and a toroidal-shaped fluid impervious ring of resilient and deformable material positioned in the groove. The groove has greater axial length than the thickness of the ring whereby the ring may have limited rolling contact with the rounded shoulder. An annular recess in the other member adjacent to the groove coacts with the first mentioned annular recess to provide an axial fluid passage upon the core member being moved to cause the groove and ring to overlie the first mentioned passage.

U.S. Pat. No. 2,782,801 to Ludwig discloses a valve structure comprising a valve housing having a bore formed therethrough communicating with inlet and outlet ports with a valve spool body being slidable in the bore. A plurality of stepped peripherally disposed cylindrical flanges are formed on the body intermediate the ends. The flanges are spaced apart by channels of equal width and which extend inwardly beyond the surface of the spool body. A body of flexible sealing material is molded on the stepped flanges and filling the channels and engaging a face of the largest of the stepped flanges and projecting beyond the periphery of the largest flange and engaging the inner surface of the bore. The outer surface of the sealing body is tapered away from the periphery thereof to the periphery of the spool body.

U.S. Pat. No. 3,990,477 to Johnson discloses a flow control valve including a valve body defining a main bore and a cross-drilled bore communicating therewith. A valve spool is reciprocable within the main bore and includes first and second lands connected by a reduced diameter connecting portion. The connecting portion has fixed relative thereto and thereabout an annular rib positioned between the two lands. The rib acts as a guide to direct fluid substantially perpendicular to the axis of reciprocal motion of the spool when the spool is positioned to allow fluid flow between the main and cross-drilled bores to minimize fluid flow forces tending to hold the spool in an open position.

U.S. Pat. No. 4,066,239 to Hall discloses a fluid control valve including a valve body having a pump inlet port for connection to a relatively high pressure pump and a drain outlet port for connection to a substantially atmospheric pressure reservoir. A valve spool has a metering slot leading from the peripheral surface of a first land to a peripheral surface of a second land. The metering slot includes a substantially cylindrical pocket recessed into the second land. A groove is formed in the first land and a reduced diameter portion is positioned between the lands. The groove connects the peripheral surface of the first land with the cylindrical pocket and has an arcuate surface portion leading from the peripheral surface of the first land. An elongated bottom surface is positioned substantially parallel to the longitudinal axis of the spool and tangent to the arcuate surface portion. The spool is movable along a longitudinal axis between a first position at which flow from the pump inlet port to the drain outlet port is metered outwardly relative to the spool through the cylindrical pocket and a second position at which fluid flow from the pump inlet port to the drain outlet port is metered inwardly through the groove. The metering slot is of a construction sufficient for directing the fluid metered inwardly through the groove into the cylindrical pocket to generate a force acting on the spool tending to close the metering slot.

U.S. Pat. No. 4,182,375 to Fukano et al. discloses a spool-sleeve type change-over valve. The axial width of the intake passage is reduced relative to that of the discharge passage within a range in which the same cylinder response as attained by intake and discharge passages of the same axial width is retained.

U.S. Pat. No. 4,739,797 to Scheffel discloses a hydraulic piston-valve-type control valve that includes a housing in which a control piston is longitudinally displaceably disposed. The control piston regulates at least one fluid stream that flows through the housing by means of annular recesses and hence control surfaces formed on piston collars about a piston core. This regulation is effected by coupling the recesses between the piston collars, while appropriately longitudinally shifting the control piston, with annular control chambers on the housing side. The collars of the control piston are provided with control edges that progressively release the control chambers. The problem with heretofore known valves was that an undesired sudden increase in the flow forces could not be avoided. In addition, the manufacture of the corresponding configurations of the control edges was complicated and expensive. To remedy this problem, the course of the control edges that release or close the control chambers on the housing side, when viewed in the circumferential direction of the control piston, has no segment that extends linearly and at right angles to the center line of the piston. Each control edge follows a symmetrical course relative to a central cross section taken through its circumferential development, and each control edge also at least twice provides for the full cross-sectional opening area of the control piston.

U.S. Pat. No. 4,899,842 to Emori et al. discloses a steering force controller for power steering apparatus which controls an oil pressure supplied to an oil pressure reaction chamber in accordance with a position of a spool valve which is caused to be displaced fore and aft in accordance with a vehicle speed. The spool valve is slidably fitted into a sleeve which is in turn disposed within a bore formed in a housing. The oil pressure supplied to the oil pressure reaction chamber can be controlled in accordance with the displaced position of the spool valve with respect to the sleeve. A regulating member is provided for causing an axial displacement of the sleeve, thus facilitating a regulation of a relative position between the spool valve and the sleeve.

U.S. Pat. No. 5,058,626 to Takaoka et al. discloses a hydraulic pressure control valve including a valve body having a slide bore with a circular cross-section and an inlet port opened in an inner surface of the slide bore. A control pressure port and an outlet port are disposed at axially spaced-apart distances in this sequence. A valve spool axially is slidably fitted in the valve body with and a first variable orifice and a second variable orifice being formed between the valve body and the valve spool. The first variable orifice controls the degree of communication between the inlet port and the control pressure port. The second variable orifice controls the degree of communication between the control pressure port and the outlet port. In this hydraulic pressure control valve, the valve spool has smaller diameter portions coaxially formed therein to define annular oil passages between the inner surface of the slide bore and the valve spool and each smaller diameter portion has an outer diameter set uniformly over the axially entire length thereof.

U.S. Pat. No. 5,297,777 to Yie discloses a flow control valve for instant on-off operations with gases or liquids at relatively high pressures, such as pressures between 10,000 psi and 100,000 psi. The valve includes a valve body having two or more valve cavities in communication with each other and defined by two end seal assemblies and one or more valve port seal assemblies. An elongated, round, sliding valve stem is centrally located through the seal assemblies. End plugs are used to support the end seal assemblies. The valve stem has fluid passages which are preferably machined at a mid-section of the valve stem. The valve stem is slid parallel to a longitudinal axis to allow or prevent communication between the valve cavities by way of the fluid passage of the valve stem. Two opposite ends of the valve stem are either not exposed to the working fluid or are exposed to different pressures of the working fluid. With both opposite ends of the valve stem not being exposed to the working fluid, fluid-induced forces of relatively high magnitude are not exerted on the valve stem.

U.S. Pat. No. 5,551,482 to Dixon et. al. discloses a direct drive servo-valve having a molded plastic housing. A metal sleeve having a spool valve slidably disposed therein is placed within opposed cavities formed within opposite housing halves. The housing halves are brought together under pressure and an ultrasonic horn is activated. Energy directing beads formed on the housing halves as well as interfering surfaces about the periphery melt under a pressure and ultrasonic energy allowing the two housing halves to move toward each other and mate. Upon deactivation of the ultrasonic horn, the molten plastic material cools and forms a seal about flow ports in the metallic sleeve as well as a fusion bond about the periphery of the housing.

U.S. Pat. No. 5,606,901 to Oki discloses a turning-purpose hydraulic circuit characterized in that a discharge passage of a hydraulic pump is connected to a variable relief valve and a pump port of a directional switching valve. A first actuator port and a second actuator port of the directional switching valve are connected to a turning-purpose hydraulic motor. The pilot pressure of a pilot valve is introduced into pressure chambers for controlling a spool in the directional switching valve and is also introduced into a pressure chamber for controlling a set pressure in the variable relief valve. A metering input side portion along which a pressurized oil flows from the pump port of the spool to the first or second actuator port is formed with a portion having a configuration such that a flow force may not be produced thereat. A metering output side portion along which the pressurized oil flows from the first or second actuator port of the spool to a tank port is formed with a portion having a configuration such that a slow force may be produced thereat.

One unique diverter valve developed by the prior art was the spool diverter valve. The spool diverter valve incorporated a valve element in the general shape of a spool. The spool valve element was slidable within the internal valve chamber between a first and a second position for diverting fluid between the main port and either the first or the second port. This unique spool diverter valve was used for diverting highly viscous fluids operating at high temperatures and high pressures. In many cases, these spool diverter valves were used in association with polymer filters for filtering synthetic fibers, films, resins and the like.

The spool valve element and the internal valve chamber had a unique configuration for eliminating all regions within the spool diverter valve where the viscous fluid could remain stagnant or remain in an eddy. The spool valve element in combination with the internal valve chamber insured the viscous fluid was constantly moving through the spool diverter valve and all incoming viscous fluid was replacing the viscous fluid within the internal valve chamber. This is commonly referred to as the residence time of a fluid component. The spool diverter valve ensured that no viscous fluid would remain within the internal valve chamber during the operation thereof.

The spool diverter valve of the prior art met with substantial success and satisfied many of the needs for diverter valves for use with viscous fluids operating at high temperatures and high pressures. One disadvantage of the aforementioned spool valve diverter valve was the physical configuration of the main port relative to the first and second ports. The first and second ports were configured into a V-shape configuration with the main port positioned between the first and second ports. The spool valve element did not permit the main port to be located in a Y-shape configuration as some of the other diverter valves of the prior art. Accordingly, the viscous fluid had to change in direction almost 180 degrees when passing between the main port and either the first or the second port.

Therefore it is an object of the present invention to provide an improved diverter valve which is suitable for use with viscous fluids operating at high or low temperatures and high pressures that may be fashioned in a Y-shape configuration.

Another object of this invention is to provide the improved diverter valve having a valve element and the valve chamber configured to prevent viscous fluids from being entrapped within regions of the valve chamber.

Another object of this invention is to provide the improved diverter valve having a lower residence time within the diverter valve over similar purpose diverter valves of the prior art.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved diverter valve comprising a valve housing defining an internal chamber. A main port communicates with the internal chamber of the valve housing. A first and a second port communicate with the internal chamber of the valve housing. The main port communicates with the first and second ports in a Y-shape configuration. A spool valve element is slidably disposed in the internal chamber. An actuator slides the spool valve element from a first position whereat the main port is in fluid communication with the first port to a second position whereat the main port is in fluid communication with the second port for diverting fluid between the main port and the first port and the main port and the second port.

In a more specific embodiment of the invention, the internal chamber of the valve housing is a substantially cylindrical internal chamber. The cylindrical internal chamber extends between a first cylindrical end and a second cylindrical end. The main port communicates with the internal chamber of the valve housing through a cylindrical sidewall thereof. A first and a second port communicate with the internal chamber of the valve housing through a cylindrical sidewall thereof. The main port communicates with the cylindrical sidewall of the internal chamber on a side of the internal chamber opposite to the first and second port communicating with the cylindrical sidewall of the valve housing.

The spool valve element is slidable within the cylindrical internal chamber from the first position adjacent the first cylindrical end to the second position adjacent the second cylindrical end. The actuator includes a threaded actuator drive for sliding the spool valve element from the first position to the second position. The threaded actuator drive comprises a rotatable bushing threadably engaged with threaded stem for linearly moving the threaded stem upon rotation with the rotatable bushing. The threaded stem is connected for sliding the spool valve element from the first position to the second position upon rotation with the rotatable bushing.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 21 is a sectional view along line 21—21 in FIG. 18;

FIG. 22 is a sectional view along line 22—22 in FIG. 18;

FIG. 23 is atop view of FIG. 18;

FIG. 24 is a bottom view of FIG. 18;

Similar reference characters refer to similar parts throughout the several Figures of the drawings.

DETAILED DISCUSSION

Figure 2:
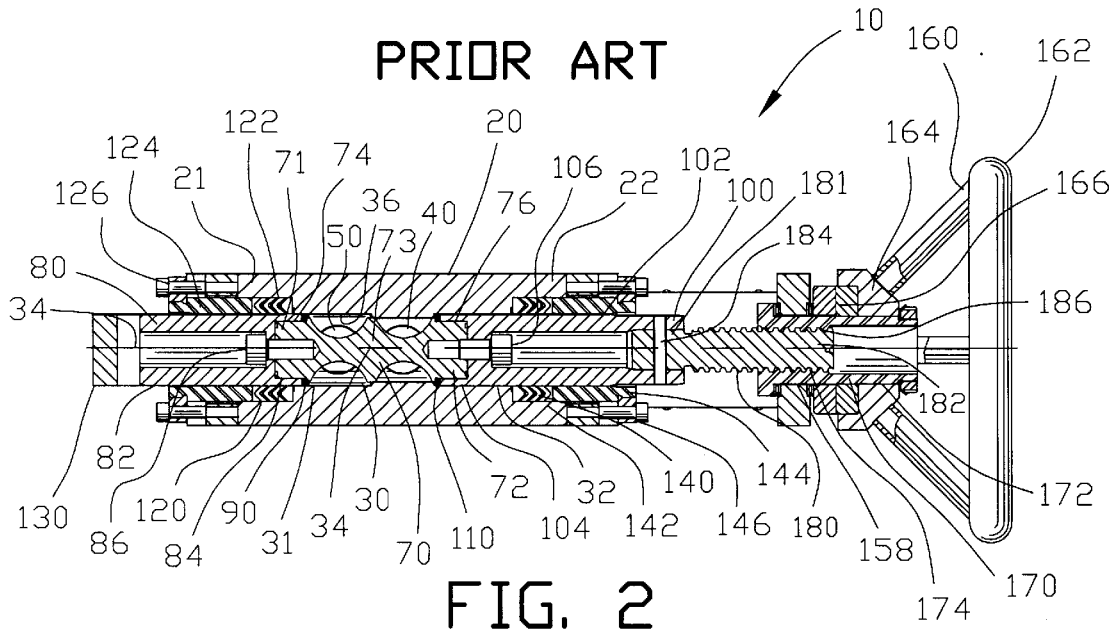
FIG. 2 is a sectional view along line 2—2 in FIG. 1.
Figure 1:
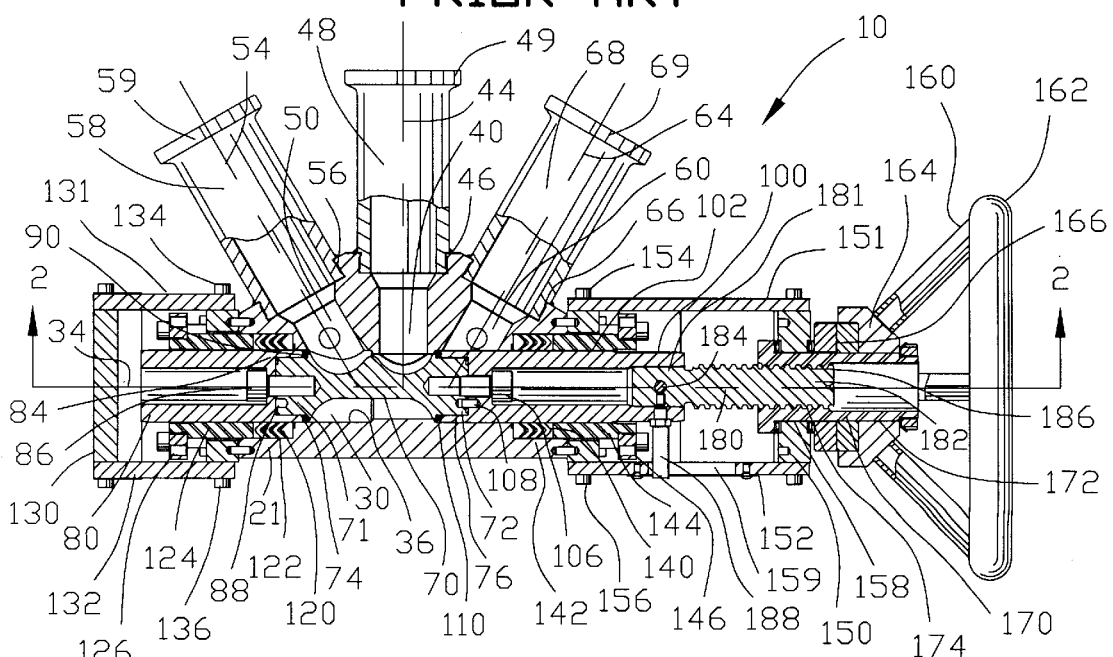
FIG. 1 is a side sectional view of a spool diverter valve of the prior art in a first operating position.

FIGS. 1 and 2 are side and top sectional views of a spool diverter valve 10 of the prior art in a first operating position. The spool diverter valve 10 comprises a valve housing 20 extending between a first and a second valve housing end 21 and 22. The valve housing 20 defines a substantially cylindrical internal chamber 30 extending between a first and a second internal chamber end 31 and 32. The cylindrical internal chamber 30 defines a cylindrical axis 34 and a cylindrical sidewall 36.

A main port 40 communicates with the internal chamber 30 of the valve housing 20. The main port 40 defines a main port axis 44. The main port axis 44 of the main port 40 is substantially perpendicular to the cylindrical axis 34 of the cylindrical internal chamber 30. The main port 40 includes a threaded aperture 46 for receiving a main nozzle 48 terminating in a flange 49.

A first port 50 communicating with the internal chamber 30 of the valve housing 20. The first port 50 defines a first port axis 54. The first port axis 54 of the first port 50 is angularly disposed relative to the cylindrical axis 34 of the cylindrical internal chamber 30. The first port 50 includes a threaded aperture 56 for receiving a first nozzle 58 terminating in a flange 59.

A second port 60 communicating with the internal chamber 30 of the valve housing 20. The second port 60 defines a second port axis 64. The second port axis 64 of the second port 60 is angularly disposed relative to the cylindrical axis 34 of the cylindrical internal chamber 30. The second port 60 includes a threaded aperture 66 for receiving a second nozzle 68 terminating in a flange 69.

The first port axis 54 of the first port 50 and the second port axis 64 of the second port 60 form a substantial V-shape.

The main port axis 44 of the main port 40 is interposed between the first and second port axes 54 and 64 of the first and second ports 50 and 60. The main port axis 44 bisects the first and second port axes 54 and 64.

A spool valve element 70 is slidably disposed in the internal chamber 30. The spool valve element 70 extends between a first and a second cylindrical end 71 and 72. The first and second cylindrical ends 71 and 72 are interconnected by an intermediate portion 73 of the spool valve element 70. The first and second cylindrical ends 71 and 72 define first and second recessed ends 74 and 76. The intermediate portion 73 of the spool valve element 70 will be described in greater hereinafter.

A valve element follower 80 defines an outer cylindrical surface 82 for slidably engaging with the cylindrical sidewall 36 of the internal chamber 30. The valve element follower 80 includes a sleeve 84 for receiving the first recessed end 74 of the first cylindrical end 71 of the spool valve element 70. The valve element follower 80 is secured to the first end 71 of the spool valve element 70 by a threaded fastener 86. A pin 88 coacts between the spool valve element 70 and the valve element follower 80 for inhibiting rotation therebetween.

A first annular seal 90 is located on the first recessed end 74 of the first cylindrical end 71 of the spool valve element 70. The first annular seal 90 is entrapped between the spool valve element 70 and the valve element follower 80. The first annular seal 90 forms a sliding seal with the cylindrical sidewall 36 of the internal chamber 30.

A valve element operator 100 defines an outer cylindrical surface 102 for slidably engaging with the cylindrical sidewall 36 of the internal chamber 30. The valve element operator 100 includes a sleeve 104 for receiving the second recessed end 76 of the second cylindrical end 72 of the spool valve element 70. The valve element operator 100 is secured to the second end 72 of the spool valve element 70 by a threaded fastener 106. A pin 108 coacts between the spool valve element 70 and the valve element operator 100 for inhibiting rotation therebetween.

A second annular seal 110 is located on the second recessed end 76 of the second cylindrical end 72 of the spool valve element 70. The second annular seal 110 is entrapped between the spool valve element 70 and the valve element operator 100. The second annular seal 110 forms a sliding seal with the cylindrical sidewall 36 of the internal chamber 30.

A first chevron packing seal 120 is located within a first cylindrical recess 122 defined within the first valve housing end 21 of the valve housing 20. A first cylindrical compression member 124 extends into the first cylindrical recess 122 to engage the first chevron packing seal 120. A first clamping assembly 126 is affixed to the first end 21 of the valve housing 20 for providing the compression force to the first cylindrical compression member 124. The first cylindrical compression member 124 provides a compression force to the first chevron packing seal 120 for forming a seal between the valve element follower 80 and the cylindrical sidewall 36 of the internal chamber 30.

A first guard plate 130 is secured to the first end 21 of the valve housing 20. Plural brackets 131 and 132 affix the first guard plate 130 to the first end 21 of the valve housing 20 by threaded fasteners 134 and 136. The first guard plate 130 provides a safety feature for retaining the spool valve element 70 within the first guard plate 130 in the remote event of malfunction of the spool diverter valve 10. The safety feature is desirable since the spool diverter valve 10 of the prior art is capable of operating at a high pressure and a high temperature.

A second chevron packing seal 140 is located within a second cylindrical recess 142 defined within the second valve housing end 22 of the valve housing 20. A second cylindrical compression member 144 extends into the second cylindrical recess 142 to engage the second chevron packing seal 140. A second clamping assembly 146 is affixed to the second end 22 of the valve housing 20 for providing the compression force to the second cylindrical compression member 144. The second cylindrical compression member 144 provides a compression force to the second chevron packing seal 140 for forming a seal between the valve element operator 100 and the cylindrical sidewall 36 of the internal chamber 30.

A second guard plate 150 is secured to the second end 22 of the valve housing 20. Plural brackets 151 and 152 affix the second guard plate 150 to the second end 22 of the valve housing 20 by threaded fasteners 154 and 156. The second guard plate 150 defines an opening 158. A slot 159 is located within the brackets 152. The second guard plate 150 provides a safety feature for retaining the spool valve element 70 within the second guard plate 150 in the remote event of malfunction of the spool diverter valve 10.

An actuator assembly 160 is secured to the second guard plate 150 for moving the spool valve element 70 within the cylindrical internal chamber 30 of the valve housing 20. The actuator assembly 160 comprises a control wheel 162 connected to a hub 164 having a central aperture 166. A sleeve bushing 170 is affixed to the central aperture 166 of the hub 164. The sleeve bushing 170 comprises an outer bearing surface 172 rotatably mounted within the opening 158 defined in the second guard plate 150. The sleeve bushing 170 includes a threaded internal bore 174.

A stem 180 extends between a first end 181 and a second end 182. The first end of the stem 180 is rotatably affixed to the valve element operator 100 by a pin 184 for enabling the stem 180 to rotate relative to the valve element operator 100. The second end of the stem 180 defines threads 186. The threads 186 of the second end 182 of the stem 180 threadably engage with the threaded internal bore 174 of the sleeve bushing 170.

An anti-rotation pin 188 extends from the valve element operator 100 and engages the slot 159 defined in the bracket 152. The anti-rotation pin 188 inhibites rotation of the valve element operator 100 during the rotation of the control wheel 162.

FIGS. 1 and 2 illustrate the spool diverter valve 10 of the prior art illustrated in a first operating position whereat the main port 40 is in fluid communication with the first port 50. When the main port 40 is in fluid communication with the first port 50, a viscous fluid may flow between the main port 40 and the first port 50 around the intermediate portion 73 of the spool valve element 70.

Figure 4:
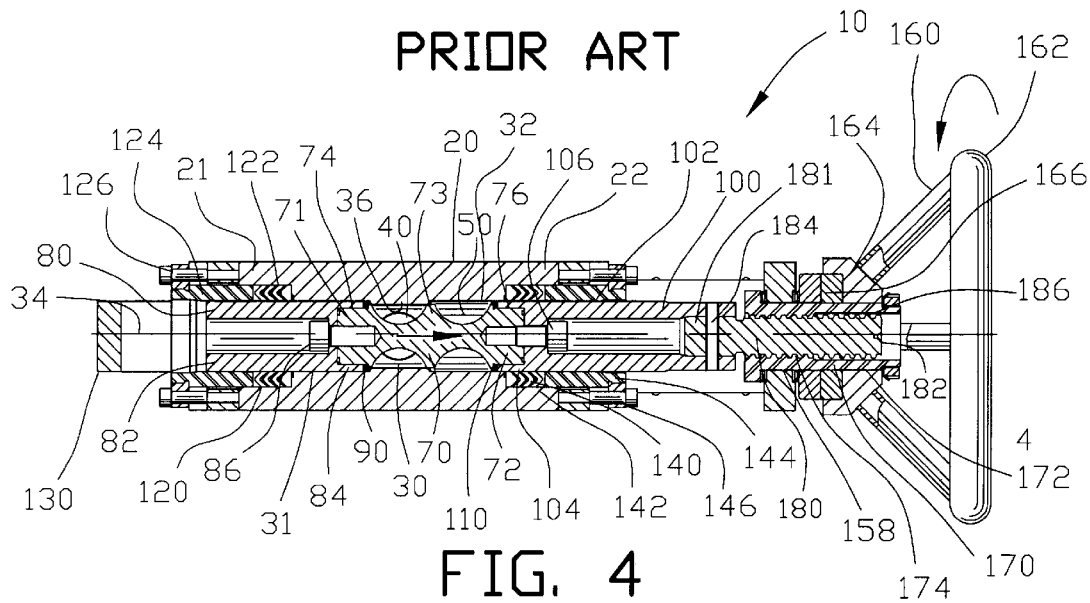
FIG. 4 is a sectional view along line 4—4 in FIG. 3.
Figure 3:
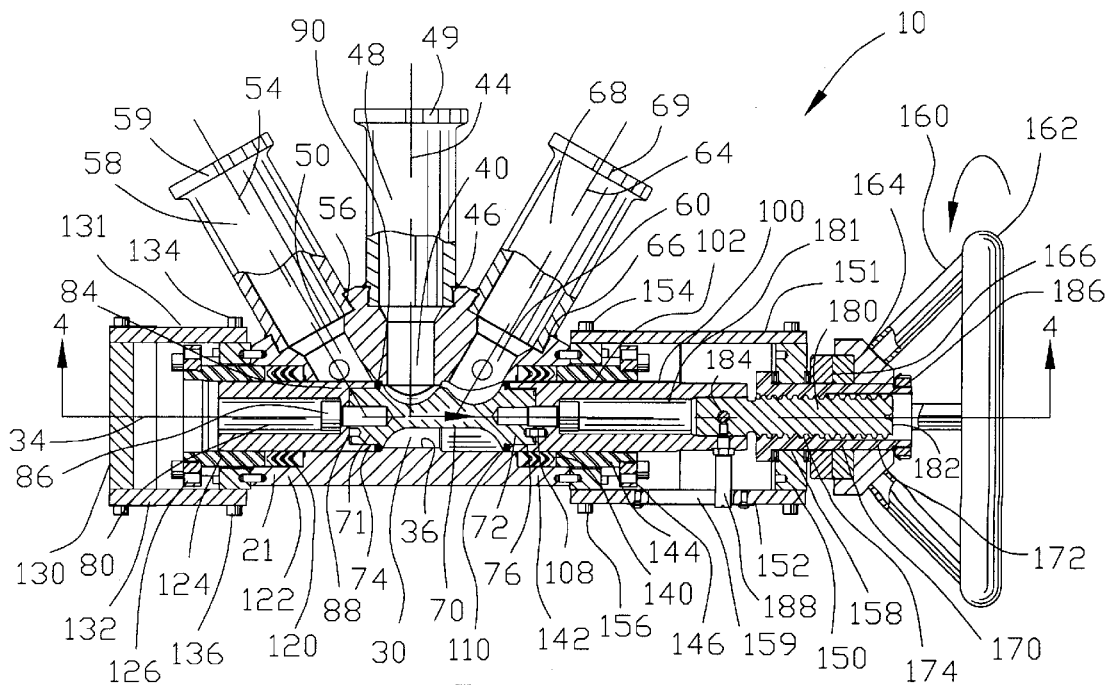
FIG. 3 is a view similar to FIG. 1 of the spool diverter valve of the prior art illustrated in a second operating position.
Figure 5:
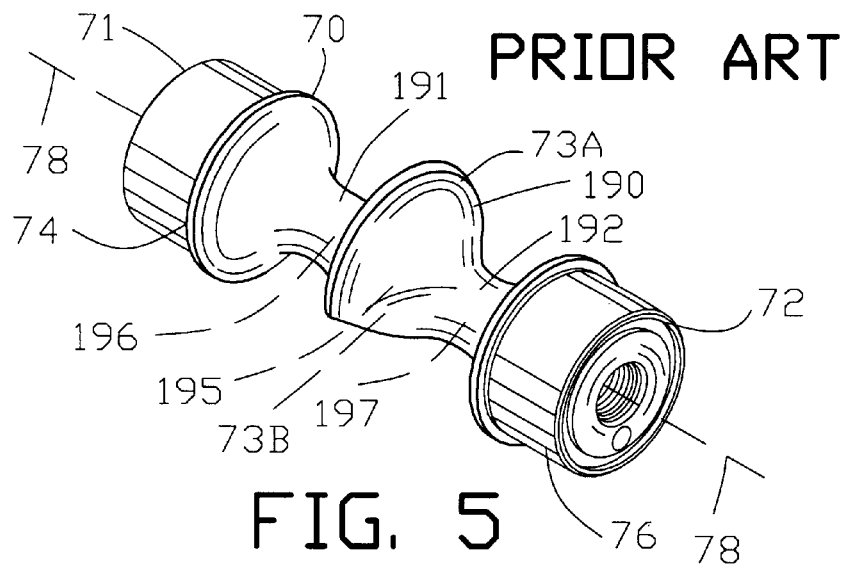
FIG. 5 is an enlarged isometric view of a spool valve element of the spool diverter valve of the prior art shown in FIGS. 1–4.
Figure 6:
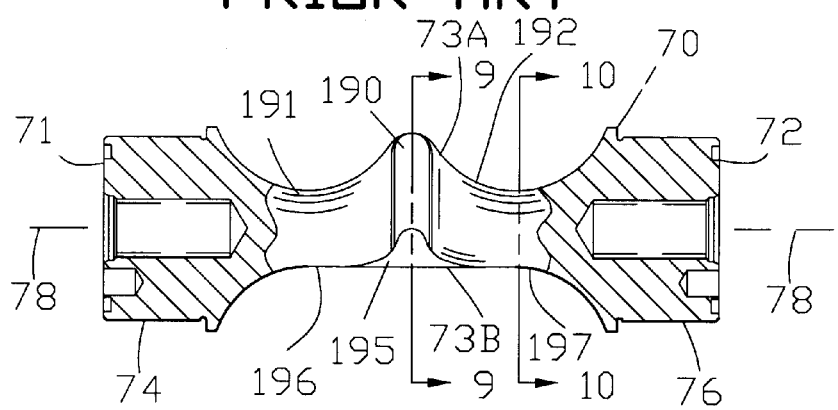
FIG. 6 is a side view partially in section of the spool valve element of FIG. 5.
Figures 7, 8:
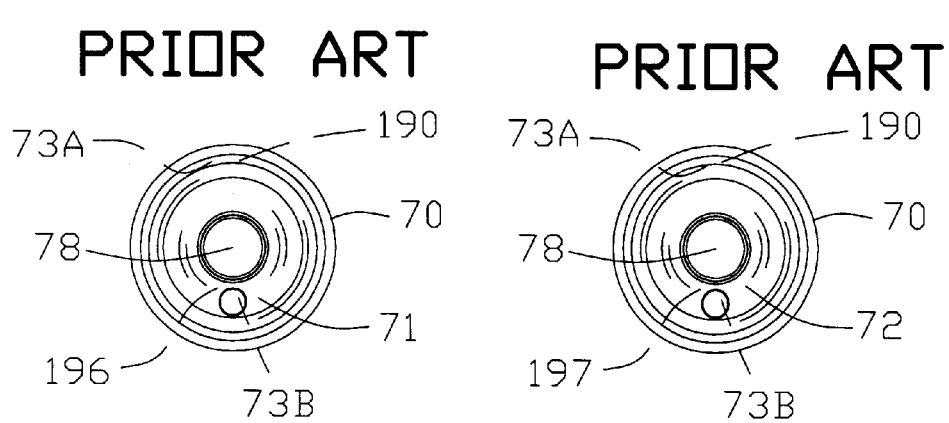
FIG. 7 is a right end view of FIG. 6.
FIG. 8 is a right end view of FIG. 6.
Figure 9:
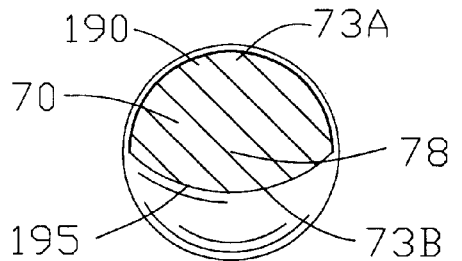
FIG. 9 is a sectional view along line 9—9 in FIG. 6.
Figure 10:
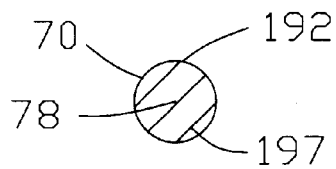
FIG. 10 is a sectional view along line 10—10 in FIG. 6.
Figure 11:
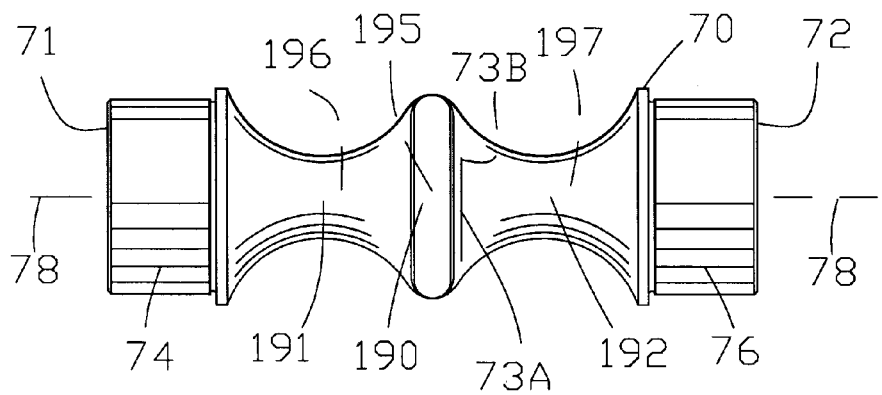
FIG. 11 is a top view of FIG. 6.
Figure 12:
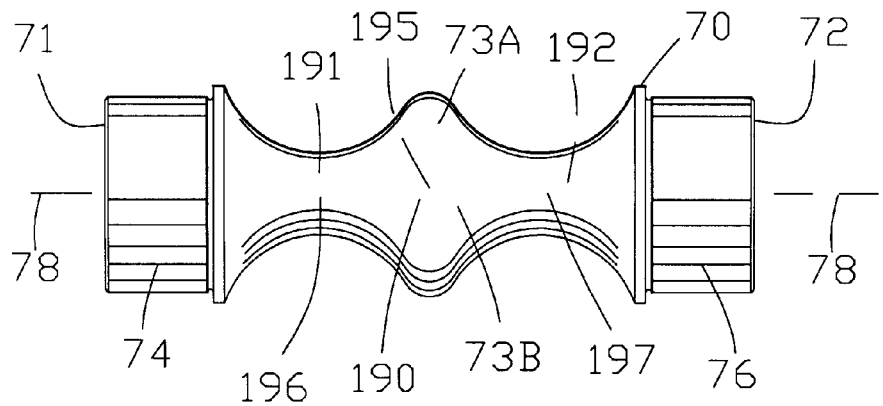
FIG. 12 is a bottom view of FIG. 6.

FIGS. 3 and 4 are views similar to FIGS. 1 and 2 of the spool diverter valve 10 of the prior art illustrated in a second operating position. A rotation of the control wheel 162 moves the spool valve element 70 within the cylindrical internal chamber 30 of the valve housing 20 to the second operating position. When the main port 40 is in fluid communication with the second port 60, a viscous fluid may flow between the main port 40 and the second port 60 around the intermediate portion 73 of the spool valve element 70.

FIGS. 5–12 are various enlarged views of the spool valve element 70 of the spool diverter valve 10. The intermediate portion 73 of the spool valve element 70 is not symmetrical about a cylindrical axis 78 extending through the spool valve element 70. An first lateral region 73A of the intermediate portion 73 of the spool valve element 70 in FIGS. 5 and 6 defines a crest 190 with a first and a second arcuate surface 191 and 192 interconnecting the crest 190 to the first and second cylindrical ends 71 and 72. A second lateral region 73B of the intermediate portion 73 of the spool valve element 70 in FIGS. 5 and 6 defines a linear surface 195 with a first and a second arcuate surface 196 and 197 interconnecting the linear surface 195 to the first and second cylindrical ends 71 and 72.

One disadvantage of the spool valve diverter valve 70 shown in FIGS. 1–9 was the location of the main port 40 interposed between the first and second ports 50 and 60. The spool valve element 70 does not permit the main port 40 to be located in a Y-shape configuration as some of the other diverter valves of the prior art. Accordingly, the viscous fluid had to change in direction almost 180 degrees when passing between the main port 40 and either the first or the second ports 50 and 60.

Figure 14:
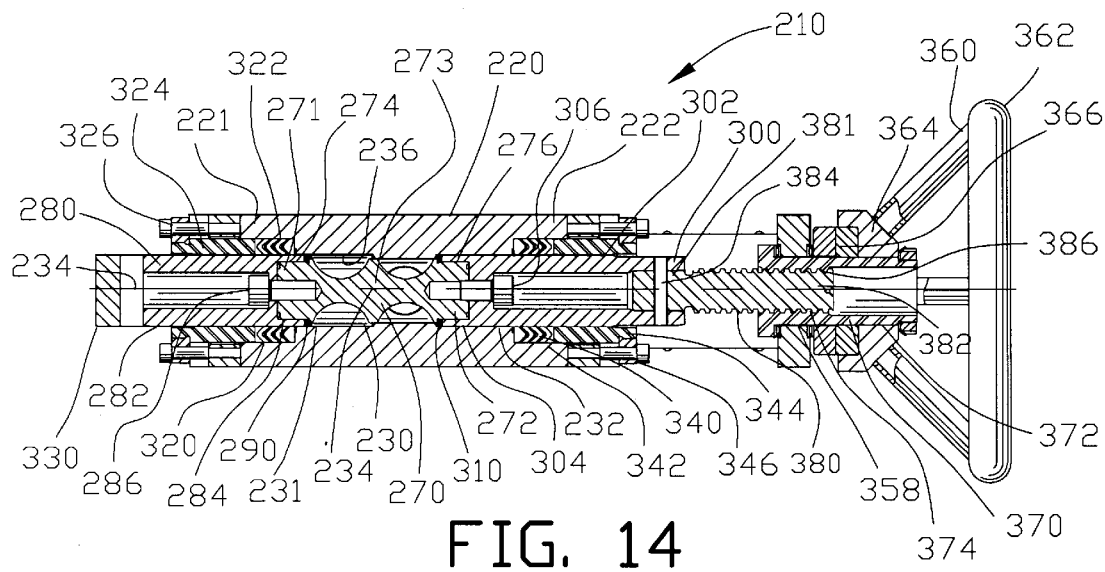
FIG. 14 is a sectional view along line 14—14 in FIG. 13.
Figure 13:
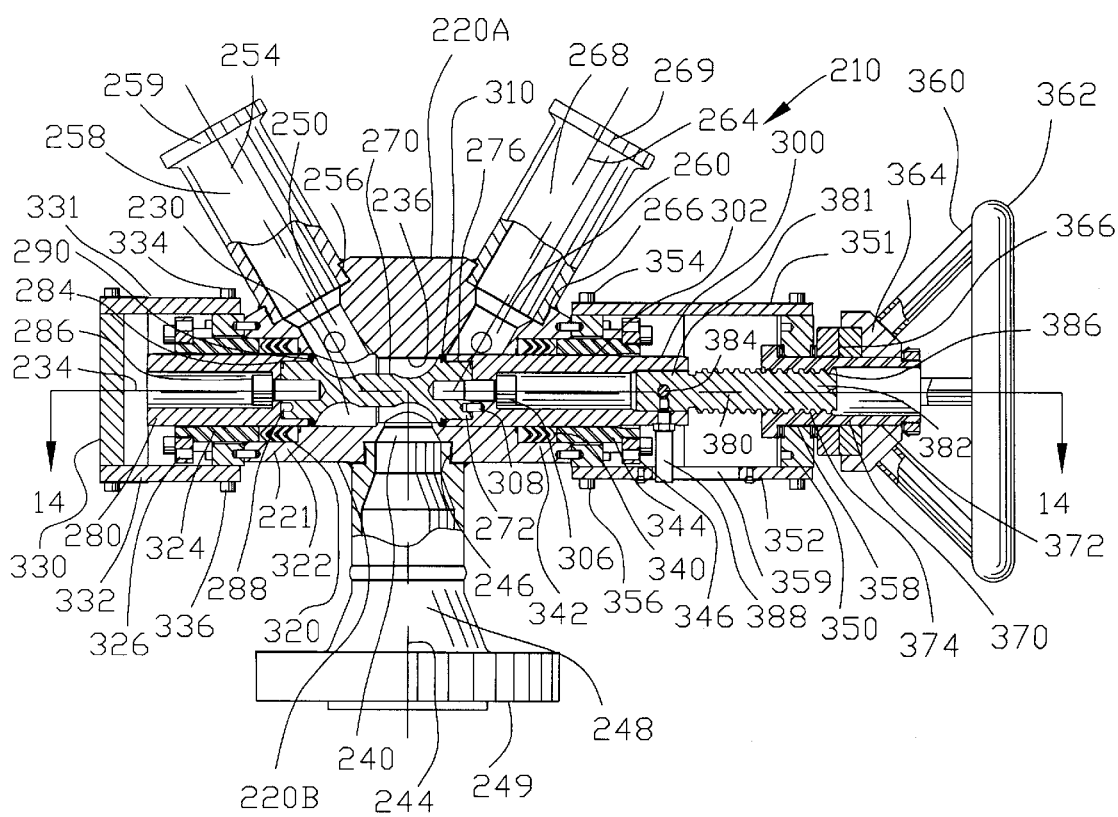
FIG. 13 is a side sectional view of the improved diverter valve of the present invention in a first operating position.

FIGS. 13 and 14 are side and top sectional views of an improved diverter valve 210 of the present invention in a first operating position. The improved diverter valve 210 comprises a valve housing 220 extending between a first and a second valve housing end 221 and 222. The valve housing 220 defines a first and a second lateral region 220A located on opposite sides of the valve housing 220. The valve housing 220 defines a substantially cylindrical internal chamber 230 extending between a first and a second internal chamber end 231 and 232. The cylindrical internal chamber 230 defines a cylindrical axis 234 and a cylindrical sidewall 236.

A main port 240 communicating with the internal chamber 230 of the valve housing 220. The main port 240 defines a main port axis 244. The main port axis 244 of the main port 240 is substantially perpendicular to the cylindrical axis 234 of the cylindrical internal chamber 230. The main port 240 includes a threaded aperture 246 for receiving a main nozzle 248 terminating in a flange 249.

A first port 250 communicating with the internal chamber 230 of the valve housing 220. The first port 250 defines a first port axis 254. The first port axis 254 of the first port 250 is angularly disposed relative to the cylindrical axis 234 of the cylindrical internal chamber 230. The first port 250 includes a threaded aperture 256 for receiving a first nozzle 258 terminating in a flange 259.

A second port 260 communicating with the internal chamber 230 of the valve housing 220. The second port 260 defines a second port axis 264. The second port axis 264 of the second port 260 is angularly disposed relative to the cylindrical axis 234 of the cylindrical internal chamber 230. The second port 260 includes a threaded aperture 266 for receiving a second nozzle 268 terminating in a flange 269.

The first and second ports 250 and 260 are located on the first lateral region 220A of the valve housing 220. The first port axis 254 of the first port 250 and the second port axis 264 of the second port 260 form a substantial V-shape. The main port 240 is located on the second lateral region 220B of the valve housing 220. The main port axis 244 of the main port 240 intersects with the first and second port axes 254 and 264 in a Y-shape configuration.

A valve element 270 is slidably disposed in the internal chamber 230. The valve element 270 extends between a first and a second cylindrical end 271 and 272. The first and second cylindrical ends 271 and 272 are interconnected by an intermediate portion 273 of the valve element 270. The first and second cylindrical ends 271 and 272 define first and second recessed ends 274 and 276. The intermediate portion 273 of the valve element 270 will be described in greater hereinafter.

A valve element follower 280 defines an outer cylindrical surface 282 for slidably engaging with the cylindrical sidewall 236 of the internal chamber 230. The valve element follower 280 includes a sleeve 284 for receiving the first recessed end 274 of the first cylindrical end 271 of the valve element 270. The valve element follower 280 is secured to the first end 271 of the valve element 270 by a threaded fastener 286. A pin 288 coacts between the valve element 270 and the valve element follower 280 for inhibiting rotation therebetween.

A first annular seal 290 is located on the first recessed end 274 of the first cylindrical end 271 of the valve element 270. The first annular seal 290 is entrapped between the valve element 270 and the valve element follower 280. The first annular seal 290 forms a sliding seal with the cylindrical sidewall 236 of the internal chamber 230.

A valve element operator 300 defines an outer cylindrical surface 302 for slidably engaging with the cylindrical sidewall 236 of the internal chamber 230. The valve element operator 300 includes a sleeve 304 for receiving the second recessed end 276 of the second cylindrical end 272 of the valve element 270. The valve element operator 300 is secured to the second end 272 of the valve element 270 by a threaded fastener 306. A pin 308 coacts between the valve element 270 and the valve element operator 300 for inhibiting rotation therebetween.

A second annular seal 310 is located on the second recessed end 276 of the second cylindrical end 272 of the valve element 270. The second annular seal 310 is entrapped between the valve element 270 and the valve element operator 300. The second annular seal 310 forms a sliding seal with the cylindrical sidewall 236 of the internal chamber 230.

A first chevron packing seal 320 is located within a first cylindrical recess 322 defined within the first valve housing end 221 of the valve housing 220. A first cylindrical compression member 324 extends into the first cylindrical recess 322 to engage the first chevron packing seal 320. A first clamping assembly 326 is affixed to the first end 221 of the valve housing 220 for providing the compression force to the first cylindrical compression member 324. The first cylindrical compression member 324 provides a compression force to the first chevron packing seal 320 for forming a seal between the valve element follower 280 and the cylindrical sidewall 236 of the internal chamber 230.

A first guard plate 330 is secured to the first end 221 of the valve housing 220. Plural brackets 331 and 332 affix the first guard plate 330 to the first end 221 of the valve housing 220 by threaded fasteners 334 and 336. The first guard plate 330 provides a safety feature for retaining the valve element 270 in the remote event of malfunction of the improved diverter valve 210.

A second chevron packing seal 340 is located within a second cylindrical recess 342 defined within the second valve housing end 222 of the valve housing 220. A second cylindrical compression member 344 extends into the second cylindrical recess 342 to engage the second chevron packing seal 340. A second clamping assembly 346 is affixed to the second end 222 of the valve housing 220 for providing the compression force to the second cylindrical compression member 344. The second cylindrical compression member 344 provides a compression force to the second chevron packing seal 340 for forming a seal between the valve element operator 300 and the cylindrical sidewall 236 of the internal chamber 230.

A second guard plate 350 is secured to the second end 222 of the valve housing 220. Plural brackets 351 and 352 affix the second guard plate 350 to the second end 222 of the valve housing 220 by threaded fasteners 354 and 356. The second guard plate 350 defines an opening 358. A slot 359 is located within the brackets 352. The second guard plate 350 provides a safety feature for retaining the valve element 270 in the remote event of malfunction of the improved diverter valve 210.

An actuator assembly 360 is secured to the second guard plate 350 for moving the valve element 270 within the cylindrical internal chamber 230 of the valve housing 220. The actuator assembly 360 comprises a control wheel 362 connected to a hub 364 having a central aperture 366. A sleeve bushing 370 is affixed to the central aperture 366 of the hub 364. The sleeve bushing 370 comprises an outer bearing surface 372 rotatably mounted within the opening 358 defined in the second guard plate 350. The sleeve bushing 370 includes a threaded internal bore 374.

A stem 380 extends between a first end 381 and a second end 382. The first end of the stem 380 is rotatably affixed to the valve element operator 300 by a pin 384 enabling the stem 380 to rotate relative to the valve element operator 3000. The second end of the stem 380 defines threads 386. The threads 386 of the second end 382 of the stem 380 threadably engage with the threaded internal bore 374 of the sleeve bushing 370.

An anti-rotation pin 388 extends from the valve element operator 300 and engages the slot 359 defined in the bracket 352. The anti-rotation pin 388 inhibiting rotation of the valve element operator 300 during the rotation of the control wheel 362.

FIGS. 13 and 14 illustrate the improved diverter valve 210 of the present invention illustrated in a first operating position whereat the main port 240 is in fluid communication with the first port 250. When the main port 240 is in fluid communication with the first port 250, a viscous fluid may flow between the main port 240 and the first port 250 around the intermediate portion 273 of the valve element 270.

Figure 16:
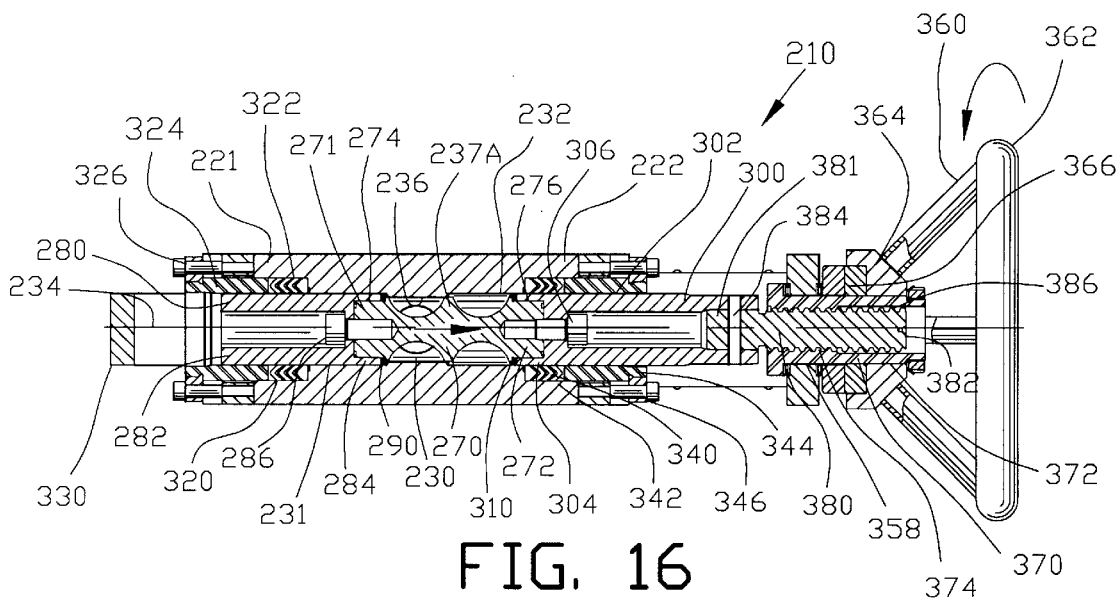
FIG. 16 is a sectional view along line 16—16 in FIG. 15.
Figure 15:
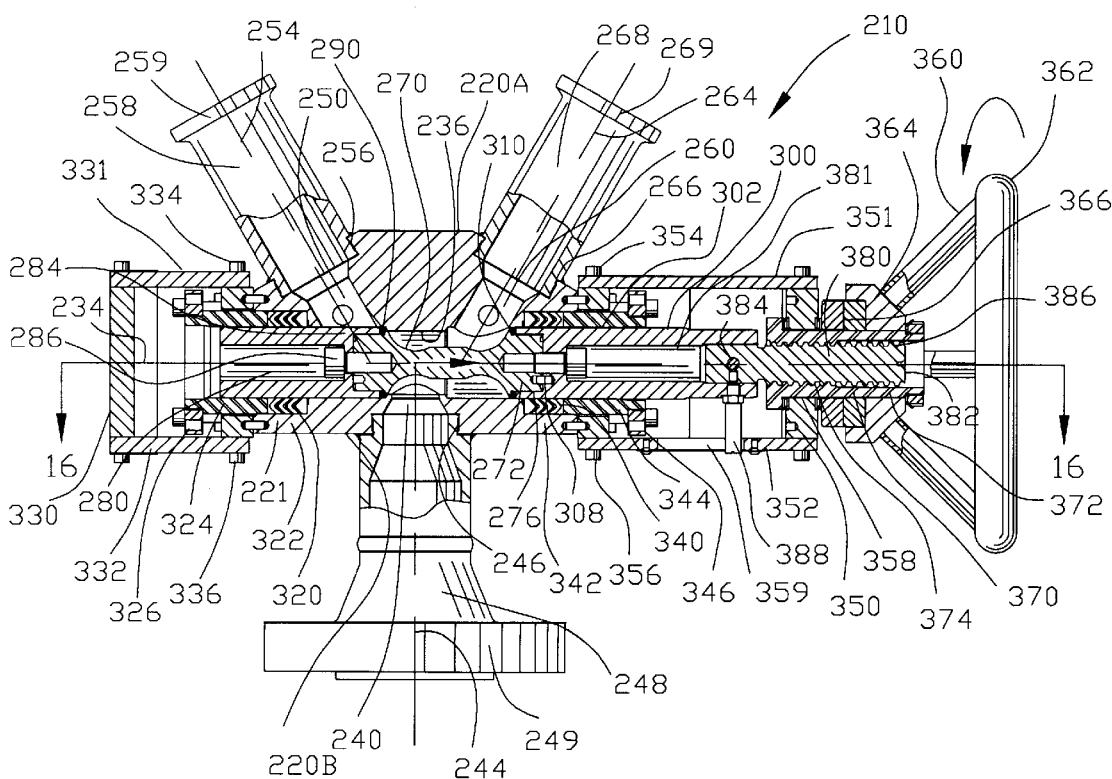
FIG. 15 is a view similar to FIG. 13 of the improved diverter valve of the present invention illustrated in a second operating position.
Figure 17:
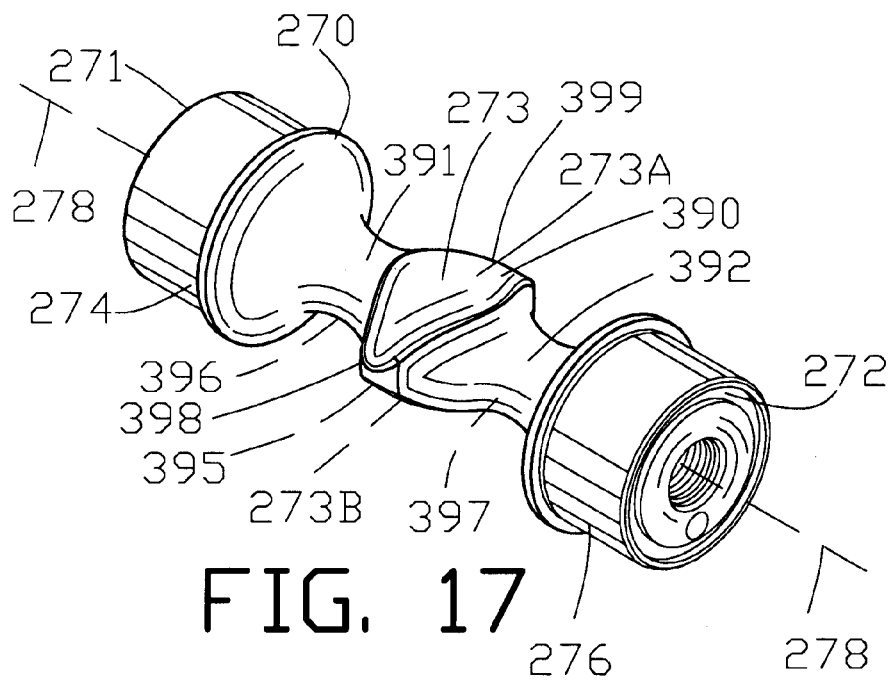
FIG. 17 is an enlarged isometric view of a spool valve element of the improved spool diverter valve of the present invention shown in FIGS. 13–16.
Figure 18:
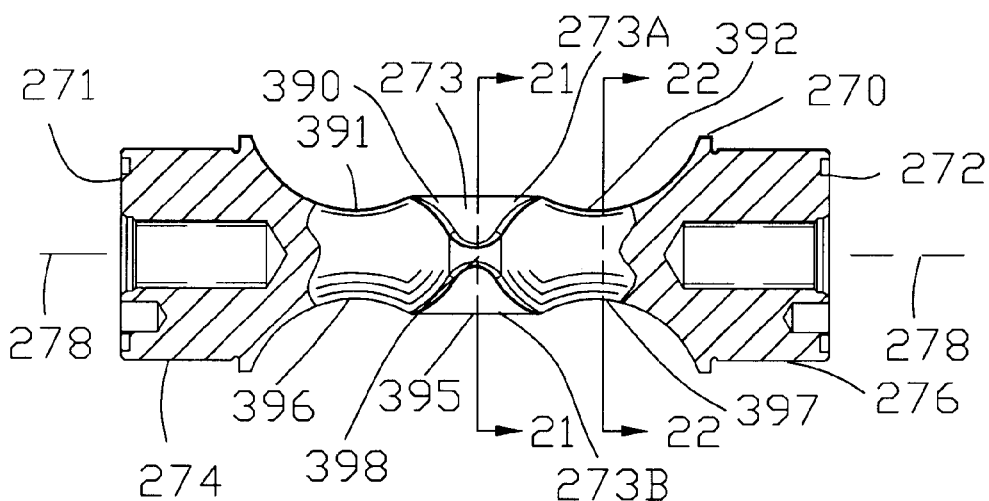
FIG. 18 is a side view partially in section of the spool valve element of FIG. 17.
Figure 19:
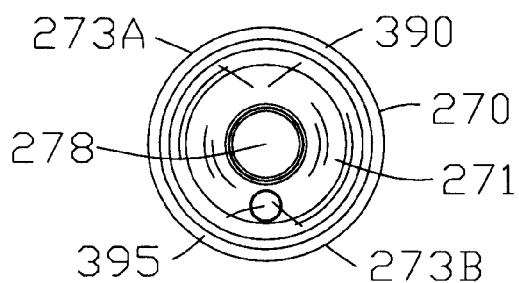
FIG. 19 is a right end view of FIG. 18.
Figure 20:
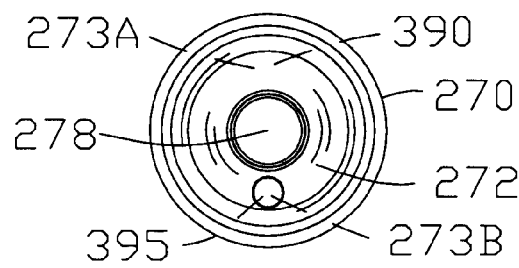
FIG. 20 is a right end view of FIG. 18.

FIGS. 15 and 16 are views similar to FIGS. 13 and 14 of the improved diverter valve 210 of the present invention illustrated in a second operating position. A rotation of the control wheel 362 moves the valve element 270 within the cylindrical internal chamber 230 of the valve housing 220 to the second operating position. When the main port 240 is in fluid communication with the second port 260, a viscous fluid may flow between the main port 240 and the second port 260 around the intermediate portion 273 of the valve element 270.

FIGS. 17–24 are various enlarged views of the valve element 270 of the improved diverter valve 210. The intermediate portion 273 of the valve element 270 is not symmetrical about a cylindrical axis 278 extending through the valve element 270. A first lateral region 273A of the intermediate portion 273 of the valve element 270 defines a linear surface 390 with a first and a second partially arcuate surface 391 and 392 interconnecting the linear surface 390 to the first and second cylindrical ends 271 and 272. In a similar manner, a second lateral region 273B of the intermediate portion 273 of the valve element 270 in FIGS. 14 and 15 defines a linear surface 395 with a first and a second partially arcuate surface 396 and 397 interconnecting the linear surface 395 to the first and second cylindrical ends 271 and 272.

The first and second lateral regions 273A and 273B of the intermediate portion 273 of the valve element 270 defines extensions 398 and 399 extending outwardly from the cylindrical axis 278. The extensions 398 and 399 extend outwardly to a distance slightly less that the diameter of the first and second recessed ends 274 and 276. The extensions 398 and 399 extend outwardly from the cylindrical axis 278 to form generally oval first and second lateral regions 273A and 273B of the intermediate portion 273 of the valve element 270.

Figure 25:
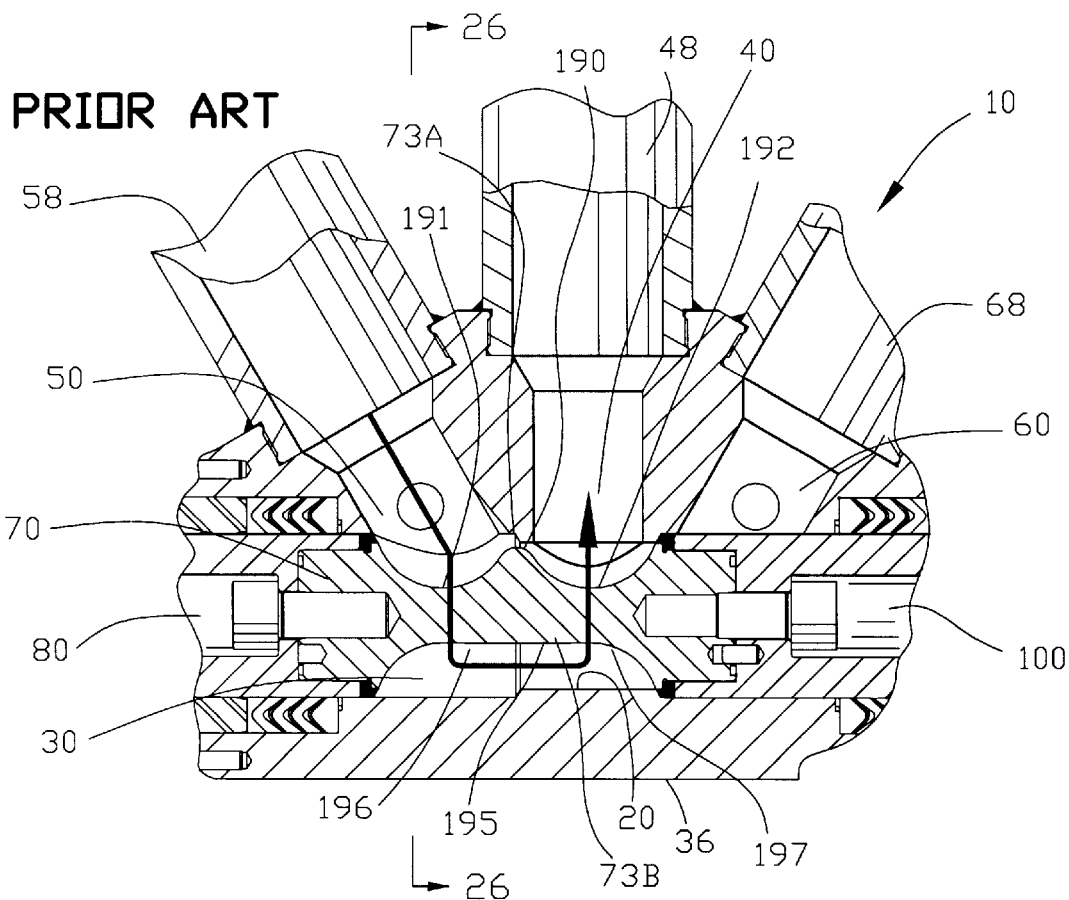
FIG. 25 is an enlarged view of a portion of FIG. 2 illustrating the operation of the diverter valve of the prior art.
Figure 26:
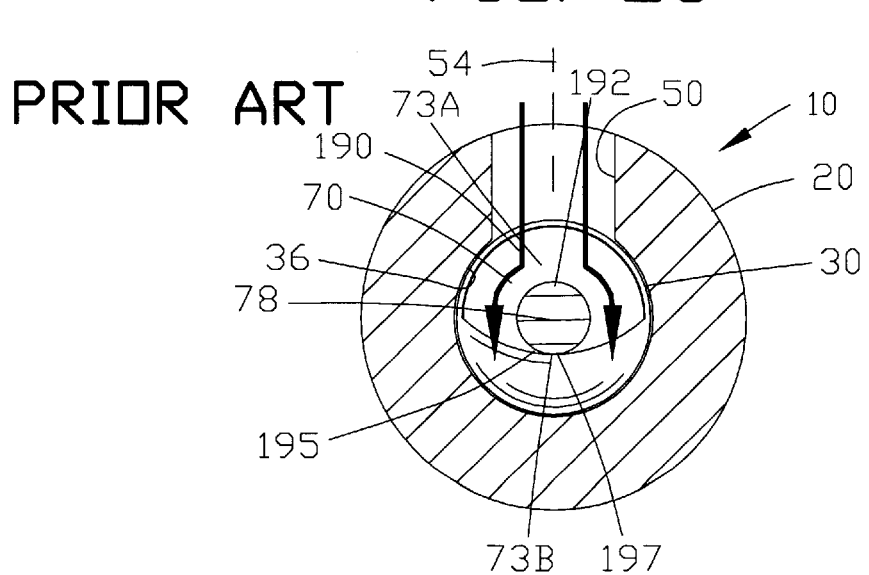
FIG. 26 is a sectional view along line 26—26 in FIG. 25.

FIGS. 25 and 26 are enlarged views of a portion of FIG. 2 illustrating the path of fluid flow within the cylindrical internal chamber 30 of the valve housing 20. The crest 190 cooperates with the cylindrical sidewall 36 of the internal chamber 30 to isolate the main port 40 from either the first or the second ports 50 and 60. If the fluid is flowing between the main port 40 and the first port 50, the crest 190 directs the fluid to flow around the second lateral region 73B of the intermediate portion 73. This flow reduces the residence time as well as substantially reducing the formation of eddies within the internal chamber 30.

If the main port 40 is positioned in a Y-shape configuration as the main port 240 in FIGS. 10–13, then an eddy would be created adjacent to the second arcuate surface 192. The eddy substantially increases the residence time of the fluid within the internal chamber 30. In addition, the fluid trapped within the eddy may rapidly degrade within the spool diverter valve 10 of the prior art. A similar difficulty exits when the spool valve element 70 is in the second operating position as shown in FIG. 4.

Figure 27:
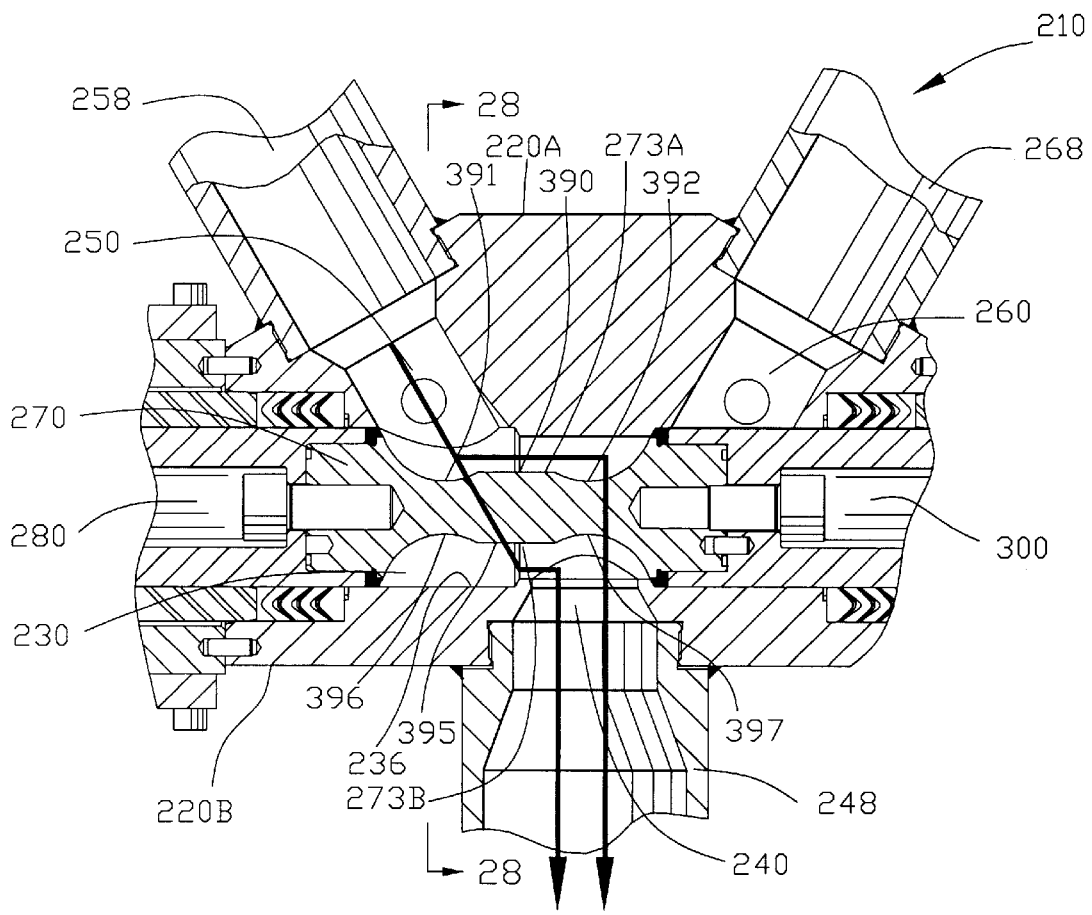
FIG. 27 is an enlarged view of a portion of FIG. 13 illustrating the operation of the diverter valve of the present invention.
Figure 28:
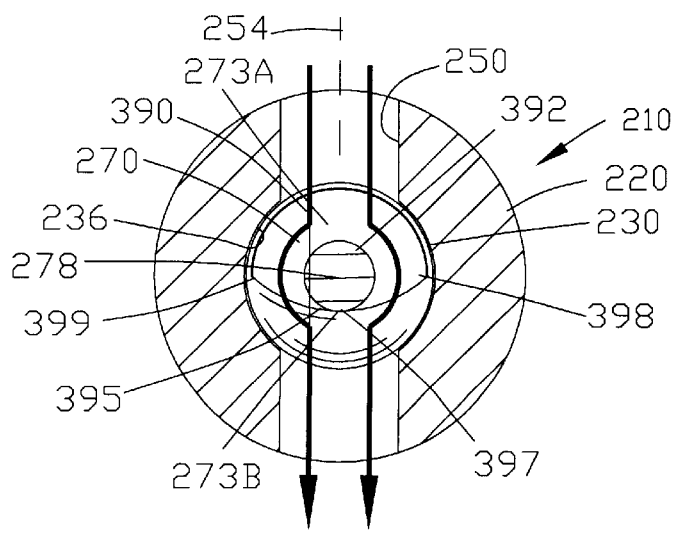
FIG. 28 is a sectional view along line 28—28 in FIG. 27.

FIGS. 27 and 28 are enlarged views of a portion of FIG. 13 illustrating the path of fluid flow within the cylindrical internal chamber 230 of the valve housing 220. The intermediate portion 273 of the valve element 270 cooperates with the cylindrical sidewall 236 of the internal chamber 230 allow fluid to flow between main port 240 and either the first or the second ports 250 and 260. If the fluid is flowing between the main port 240 and the first port 250, the fluid flows around the first and second lateral regions 273A and 273B of the intermediate portion 273.

A first portion of the fluid flows around the first arcuate surface 391 as shown by the arrow. The extensions 398 and 399 extend outwardly from the cylindrical axis 278 direct a portion of the fluid to flow over the first lateral region 273A to flow around the second arcuate surface 392 as shown by the arrow. The extensions 398 and 399 provide multiple flow paths about the valve element 270.

A small eddy is created adjacent to the second partial arcuate surface 392. Another small eddy is created adjacent to the first partial arcuate surface 396. However, these small eddies only increase the residence time by a small amount. The small increase in the residence time is outweighed by the benefits obtained by the enhanced fluid flow through the valve due to the Y-shape configuration.

The present invention provides an improved diverter valve 210 which is suitable for use with viscous fluids operating at high temperatures and high pressures that may be fashioned in a Y-shape configuration. The improved diverter valve 210 has a valve element 270 and the valve chamber 230 configured to prevent viscous fluids from being entrapped within regions of the internal chamber 230. The improved diverter valve 210 has a lower residence time within the diverter valve 210 over spool diverter valve 10 of the prior art. The improved diverter valve 210 exhibits an enhanced flow characteristics over the spool diverter valve 10 of the prior art. The improved diverter valve 210 provides an enhanced fluid flow in a Y-shape configuration diverter valve 210. The improved diverter valve 210 is especially suitable for use with the processing of non-resident time sensitive polymers.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved diverter valve, comprising;
   a valve housing defining internal chamber, wherein said internal chamber is substantially cylindrical having cylindrical sidewalls;
   a main port communicating with said internal chamber of said valve housing;
   a first and second port communicating with said internal chamber of said valve housing;
   said main port communicating with said first and second ports in a Y-shaped configuration,
   a valve element slidably disposed in said internal chamber;
   an actuator for sliding said valve element from a first position whereat said main port is in fluid communication with said first port to a second position whereat said main port is in fluid communication with said second port for diverting fluid between said main port and said first port and said main port and said second port;
   said valve element having a substantially cylindrical first and second end and having a cylindrical axis extending therethrough;
   an intermediate valve element portion interconnecting said first cylindrical end and said second cylindrical end of said valve element;
   said intermediate valve element portion defining a first and a second lateral region;
   said first and second lateral regions cooperating with said cylindrical internal chamber cylindrical sidewalls for providing a valve internal volume; and
   said valve internal volume enabling said main port fluid communication through said valve internal volume to said first port with valve element in a first position and said main port fluid communication through said valve internal volume to said second port with valve element in a second position.

2. An improved diverter valve as set forth in claim 1, wherein said internal chamber of said valve housing is a substantially cylindrical internal chamber, and
   said cylindrical internal chamber extending between a first cylindrical end and a second cylindrical end.

3. An improved diverter valve as set forth in claim 1, wherein said internal chamber of said valve housing is a substantially cylindrical internal chamber;
   said cylindrical internal chamber extending between a first cylindrical end and a second cylindrical end;
   said main port communicating with said internal chamber of said valve housing through a cylindrical sidewall thereof;
   a first and a second port communicating with said internal chamber of said valve housing through a cylindrical sidewall thereof; and said main port communicating with said cylindrical sidewall of said internal chamber on a side of said internal chamber opposite to said first and second port communicating with said cylindrical sidewall of said valve housing.

4. An improved diverter valve as set forth in claim 1, wherein said internal chamber of said valve housing is a substantially cylindrical internal chamber;

said cylindrical internal chamber extending between a first cylindrical end and a second cylindrical end; and said valve element being slidably disposed within said cylindrical internal chamber from said first position adjacent said first cylindrical end to said second position adjacent said second cylindrical end of said cylindrical internal chamber.

5. An improved diverter valve as set forth in claim 1, wherein said internal chamber of said valve housing is a substantially cylindrical internal chamber;

said cylindrical internal chamber extending between a first cylindrical end and a second cylindrical end;

said valve element being slidably disposed within said cylindrical internal chamber; and said actuator including a threaded actuator drive for sliding said valve element from said first position to said second position.

6. An improved diverter valve as set forth in claim 1, wherein said internal chamber of said valve housing is a substantially cylindrical internal chamber;

said cylindrical internal chamber extending between a first cylindrical end and a second cylindrical end;

said valve element being slidably disposed within said cylindrical internal chamber;

said actuator including a threaded actuator drive for sliding said valve element from said first position to said second position;

said threaded actuator drive comprising a rotatable bushing threadably engaged with a threaded stem for linearly moving said threaded stem upon rotation with said rotatable bushing; and said threaded stem connected for sliding said valve element from said first position to said second position upon rotation with said rotatable bushing.

7. An improved diverter valve as set forth in claim 1, wherein said Y-shape configuration comprises said valve housing having a substantially cylindrical internal chamber and a cylindrical axis extending therethrough;

said main port defining a main port axis wherein said main port axis being substantially at right angles to said cylindrical axis of said valve housing cylindrical internal chamber;

a first and a second port communicating with said internal chamber of said valve housing;

said first port defining a first port axis and said second port defining a second port axis wherein said first port axis and said second port axis each being angularly disposed relative to said cylindrical axis of said valve housing cylindrical internal chamber;

said cylindrical axis of said valve housing cylindrical internal chamber and said main port axis and said first port axis and said second port axis defining a plane; and said first port axis and said second port axis on a side of said cylindrical internal chamber opposite to said main port axis.

8. The improved diverter valve of claim 1, wherein said first lateral region defines a first extension and said second lateral region define a second extension, wherein said first and second extensions direct fluid flow through substantially all portions of said valve internal volume.

9. The improved diverter valve of claim 8, wherein the first and second extensions direct fluid flow in multiple flow paths through said valve internal volume.

10. The improved diverter valve of claim 9, wherein the first and second extensions direct fluid flow over the first and second lateral regions.

11. An improved diverter valve, comprising;

a valve housing defining an internal chamber;

a main port communicating with said internal chamber of said valve housing;

a first and a second port communicating with said internal chamber of said valve housing;

said main port communicating with said first and second ports in a Y-shaped configuration;

a valve element slidably disposed in said internal chamber;

an actuator for sliding said valve element from a first position whereat said main port is in fluid communication with said first port to a second position whereat said main port is in fluid communication with said second port for diverting fluid between said main port and said first port and said main port and said second port;

said valve housing chamber being substantially cylindrical and having cylindrical sidewalls;

said valve element having a substantially cylindrical first and second end and having a cylindrical axis extending therethrough;

a non-cylindrical intermediate valve element portion interconnecting said first cylindrical end and said second cylindrical end of said valve element;

said intermediate valve element portion defining a non-cylindrical intermediate valve element portion being asymmetrical about said cylindrical axis and defining a first and a second lateral region;

said first and second lateral region cooperating with said cylindrical internal chamber cylindrical sidewalls for providing a valve internal volume; and said valve internal volume enabling said main port fluid communication through said valve internal volume to said first port with valve element in a first position and said main port fluid communication through said valve internal volume to said second port with valve element in a second position.

12. An improved diverter valve, comprising:

a valve housing defining a cylindrical internal chamber having cylindrical sidewalls and a cylindrical axis extending therethrough;

a main port communicating with said internal chamber of said valve housing;

said main port defining a main port axis wherein said main port axis being substantially at right angles to said cylindrical axis of said valve housing cylindrical internal chamber;

a first and a second port communicating with said internal chamber of said valve housing;

said first port defining a first port axis and said second port defining a second port axis wherein said first port axis and said second port axis each being angularly disposed relative to said cylindrical axis of said valve housing cylindrical internal chamber;

said cylindrical axis of said valve housing cylindrical internal chamber and said main port axis and said first port axis and said second port axis defining a plane;

said first port axis and said second port axis on a side of said cylindrical internal chamber opposite to said main port axis enabling said main port communicating with said first and second ports in a Y-shape configuration;

a valve element slidably disposed within said internal chamber;

said valve element having a substantially cylindrical first and a second end and having a cylindrical axis extending therebetween;

a non-cylindrical intermediate valve element portion interconnecting said first cylindrical end and said second cylindrical end;

said intermediate valve element portion asymmetrical about said cylindrical axis and defining a first and a second lateral region;

said first and a second lateral regions cooperating with said cylindrical internal chamber cylindrical sidewalls for providing a valve internal volume; and said valve internal volume enabling said main port fluid communication through said valve internal volume to said first port with valve element in a first position and said main port fluid communication through said valve internal volume to said second port with valve element in a second position.

13. An improved diverter valve as set forth in claim 12, wherein said cylindrical internal chamber extends between a first cylindrical end and a second cylindrical end;

said valve element being slidably disposed within said cylindrical internal chamber from a first position adjacent said first cylindrical end to a second position adjacent said second cylindrical end of said cylindrical internal chamber.

14. An improved diverter valve as set forth in claim 12, wherein said cylindrical internal chamber extends between a first cylindrical end and a second cylindrical end;

said valve element being slidably disposed within said cylindrical internal chamber from a first position adjacent said first cylindrical end to a second position adjacent said second cylindrical end of said cylindrical internal chamber; and including an actuator for slidably moving said valve element within said cylindrical internal chamber from said first position adjacent said first cylindrical end to said second position adjacent said second cylindrical end of said cylindrical internal chamber.

15. An improved diverter valve as set forth in claim 12, wherein said cylindrical internal chamber extends between a first cylindrical end and a second cylindrical end;

said valve element being slidably disposed within said cylindrical internal chamber from a first position adjacent said first cylindrical end to a second position adjacent said second cylindrical end of said cylindrical internal chamber;

including an actuator for slidably moving said valve element within said cylindrical internal chamber from a first position adjacent said first cylindrical end to a second position adjacent said second cylindrical end;

said actuator including a threaded actuator drive for sliding said valve element from said first position to said second position;

said threaded actuator drive comprising rotatable bushing threadably engaged with threaded stem for linearly moving said threaded stem upon rotation with said rotatable bushing; and said threaded stem connected for sliding said valve element from said first position to said second position upon rotation with said rotatable bushing.

16. An improved diverter valve, comprising:

a valve housing defining a cylindrical internal chamber having cylindrical sidewalls and a cylindrical axis extending therethrough;

a main port communicating with said internal chamber of said valve housing;

said main port defining a main port axis wherein said main port axis being substantially at right angles to said cylindrical axis of said valve housing cylindrical internal chamber;

a first and a second port communicating with said internal chamber of said valve housing;

said first port defining a first port axis and said second port defining a second port axis wherein said first port axis and said second port axis each being angularly disposed relative to said cylindrical axis of said valve housing cylindrical internal chamber;

said cylindrical axis of said valve housing cylindrical internal chamber and said main port axis and said first port axis and said second port axis defining a plane;

said first port axis and said second port axis on a side of said cylindrical internal chamber opposite to said main port axis enabling said main port to communicate with said first and second ports in a Y-shape configuration;

a valve element slidably disposed within said internal chamber;

said valve element having a substantially cylindrical first and second end and having a cylindrical axis extending therethrough;

a non cylindrical intermediate valve element portion interconnecting said first cylindrical end and said second cylindrical end;

said intermediate valve element portion asymmetrical about said cylindrical axis and defining a first and a second lateral region;

said first and said second lateral regions cooperating with said cylindrical internal chamber cylindrical sidewalls for providing a valve internal volume;

said valve internal volume enabling said main port fluid communication through said valve internal volume to said first port with valve element in a first position and said main port fluid communication through said valve internal volume to said second port with valve element in a second position;

an actuator for slidably moving said valve element within said cylindrical internal chamber from a first position adjacent said first cylindrical end to a second position adjacent said second cylindrical end;

said actuator including a threaded actuator drive for sliding said valve element from said first position to said second position;

said threaded actuator drive comprising rotatable bushing threadably engaged with threaded stem for linearly moving said threaded stem upon rotation with said rotatable bushing; and said threaded stem connected for sliding said valve element from said first position to said second position upon rotation with said rotatable bushing.

* * * * *